United States Patent [19]

Bühler et al.

[11] Patent Number: 4,482,515
[45] Date of Patent: Nov. 13, 1984

[54] METHOD OF AND APPARATUS FOR PRODUCING MOLDED ARTICLES FROM POURABLE COMPOUNDS

[75] Inventors: Eugen Bühler, Schleifweg 3, D-8871-Burtenbach, Fed. Rep. of Germany; Klaus Strobel, Selb; Karl Schwarzmeier, Selb-Oberweissenbach Nr. 89, both of Fed. Rep. of Germany

[73] Assignees: Eugen Bühler, Burtenbach; Hutschenreuther AG, Selb, both of Fed. Rep. of Germany

[21] Appl. No.: 397,068

[22] Filed: Jul. 12, 1982

[30] Foreign Application Priority Data

Jul. 17, 1981 [DE] Fed. Rep. of Germany ....... 3128347

[51] Int. Cl.³ .................... B28B 3/02; B28B 13/02
[52] U.S. Cl. ...................... 264/102; 264/256; 264/314; 264/328.1; 425/546; 425/566; 425/389; 425/405 H; 425/DIG. 44; 425/DIG. 60

[58] Field of Search ............... 425/405 R, 405 H, 389, 425/406, DIG. 223, 564, DIG. 44, DIG. 60, 107, 546, 562, 566, 580; 264/101, 102, 314, 256, 328.1

[56] References Cited

U.S. PATENT DOCUMENTS

| Re. 20,460 | 8/1937 | Jeffery | 425/107 X |
|---|---|---|---|
| 2,270,075 | 1/1942 | Miller | 264/102 |
| 3,010,156 | 11/1961 | Smith | 425/564 X |
| 3,193,900 | 7/1965 | Wendt | 425/405 H |
| 3,554,087 | 1/1971 | Florjancic | 425/DIG. 223 |
| 3,557,663 | 1/1971 | Florjancic | 425/DIG. 223 |
| 3,664,799 | 5/1972 | Wallick et al. | 425/405 H X |
| 4,140,470 | 2/1979 | Pasch | 425/405 R |
| 4,306,852 | 12/1981 | Mateev et al. | 425/564 X |
| 4,350,486 | 9/1982 | Croseck et al. | 425/405 H |

FOREIGN PATENT DOCUMENTS

| 2657993 | 5/1978 | Fed. Rep. of Germany . |
| 53-7937 | 3/1978 | Japan . |
| 1443350 | 7/1976 | United Kingdom . |
| 1483286 | 8/1977 | United Kingdom . |
| 464385 | 9/1975 | U.S.S.R. . |

Primary Examiner—Willard E. Hoag
Attorney, Agent, or Firm—Toren, McGeady and Stanger

[57] ABSTRACT

In the production of molded articles from a pourable compound, such as an oxide ceramic compound, for example, a porcelain compound, an injection chamber is formed between an isostatic compression molding tool and a superposed injection head, negative pressure conditions are established within the injection chamber. The pourable compound is fluidized and is drawn into the injection chamber by the negative pressure. Subsequently, the compound is isostatically compressed while the negative pressure conditions are maintained during at least the initial phase of the compressing operation. A closing member is positioned at the opening into the injection chamber through which the pourable compound flows. The closing member is displaceable between an open position admitting flow and a closed position blocking flow into the injection chamber. In the closed position, the surface of the closing member facing into the injection chamber forms a continuation of the adjacent surface of the injection chamber.

10 Claims, 2 Drawing Figures

METHOD OF AND APPARATUS FOR PRODUCING MOLDED ARTICLES FROM POURABLE COMPOUNDS

SUMMARY OF THE INVENTION

The present invention is directed to a method of and apparatus for manufacturing molded articles from a pourable compound, such as an oxide-ceramic compound, for example, a porcelain compound, where negative pressure is established in an injection chamber formed between an isostatic compression molding tool and an injection head. The pourable compound is fluidized and then drawn through an inlet opening in the injection head into the injection chamber. After the chamber is filled, the compound is isostatically compressed while the negative pressure is maintained at least during the initial phase of the compressing operation.

A similar method is disclosed in U.S. patent application Ser. No. 224,037 filed Jan. 12, 1981 by the applicants in this application and is assigned to the same assignee as is this application. In the patent application it is provided, after the formation of a precompressed, preformed article in the injection chamber, that the injection head is lifted from the isostatic compression molding tool and the preformed article is kept in the molding tool. Subsequently, for effecting the final compression, a top force is moved into position opposite the isostatic compression molding and the preformed article is finally compressed between the top force and the isostatic compression molding tool.

The method set forth in the above-mentioned patent application has proved essentially to be successful. It has been found, however, that in carrying out the compression in two stages, that is, with the first stage in the compression chamber defined by the isostatic molding tool and the injection head and the second stage performed between the top force and the isostatic molding tool, increases the total work cycle time for the production of the molded article and presents a problem regarding economic operation. Further, particularly in the production of dish-like molded pieces having a high rim, there is the danger that the rim may collapse when the injection head is raised from the molded article when it has not been completely compressed. Moreover, depending on the degree of precompression between the injection and the isostatic compression molding tool, it is possible in this method that, when the injection head is raised from the preformed article and the top force is placed on the preformed article remaining in the isostatic compression molding tool, air is again trapped in the preformed article and such trapped air may be detrimental to the final compression molding operation and lead to rejects.

Therefore, the primary object of the present invention is to provide a method and apparatus in which the final compression of the molded article can be effected without the danger of entrapped air and where the total work cycle is reduced and the danger that high rims on the molded article might collapse during removal of the injection head, is eliminated.

In accordance with the present invention, a compound inlet opening is provided through the injection head into the injection chamber and when the opening is closed after the compound has been filled into the chamber, the surface through which the opening is formed provides a continuous uninterrupted surface and, subsequently, the molded article is finally compressed within the injection chamber.

Surprisingly, it has been found that it is possible, though very high pressures are used during the final compression step, such as 300 bars, to close the compound inlet opening into the injection chamber in such an exact manner that only insignificant marks are formed on the molded article and these marks can be removed without any further compression in a simple deflashing operation. This is all the more surprising since the compound inlet opening, because of tool design reasons, must be arranged in the injection head, that is, on the side of the molded article directed away from the isostatic compression molding tool. In particular when manufacturing tableware, the bottom side of a dish with its very characteristic profiling has to be placed on the surface of the chamber defined by the isostatic compression mold tool. As a result, the compound inlet opening is located on the side of the molded article which is smooth and is easily visible and, further, where marks are particularly undesirable. In the method according to the present invention, since the injection head and the isostatic compression molding tool are in continuous engagement until the final compression of the molded article, the vacuum or negative pressure conditions established in the injection chamber do not have to be interrupted before the molded article has reached such a density as a result of compression that the formation of entrapped air can no longer be expected.

Depending on the type of molded article being produced, it may be advantageous if the isostatic compression molding is preceded by a mechanical precompression. Such mechanical precompression can be effected by once or several times moving the molding surface of the injection head and of the isostatic compression molding tool toward one another.

Further, the present invention relates to an apparatus for producing molded articles including an isostatic compression molding tool and an injection head forming at least one suction opening and at least one compound inlet opening to the injection chamber.

Based on the disclosure in the application mentioned above, in view of the intended after-compression using a separate top force, no special mechanical load on the injection head may be expected, because only relatively low pressures are usually required for precompression. Moreover, in the above-mentioned patent application there are no special closures provided at the compound inlet opening because levelling of the surface of the article can be provided when final compression is carried out between the top force and the isostatic compression molding tool. By contrast, in accordance with the present invention, the injection head is constructed to withstand the final compression of the molded article under very high pressures, for example, 300 bars. Further, a closing member is provided for the compound inlet opening so that in the closed position the surface of the closing member facing into the injection chamber is flush with the adjacent surface of the injection chamber encircling the compound inlet opening. It would not be readily expected that the injection head, already weakened by the compound inlet opening, could be constructed so that it withstands the high pressures maintained during final compression. This is particularly true due to the fact that additional especially critical and highly stressed locations are to be expected because of the accommodation and guidance of the closing member.

To ensure that the closing member maintains its desired position in the closed position, a support surface can be provided on the closing member which bears against an opposing support surface on the injection head when it is in the closed position.

In accordance with a preferred embodiment, the isostatic compression molding tool is provided with a pressure cup, a support plate is positioned in the pressure cup and a compression membrane is placed over a molding surface on the support plate. The edge of the membrane is tightly connected to the edge of the pressure cup. A pressurized medium is supplied between the compression membrane and the support plate. Furthermore, the injection head is provided with a closure ring arranged to bear on the edge of the membrane. A molding die is provided within the closure ring with the compound inlet opening located through the molding die.

The suction opening into the injection chamber may be formed at least partially by an annular gap located between the closure ring and the molding die. The annular gap can be connected to a suction system via a suction line extending through the closure ring.

For mechanical precompression, the molding die can be moved relative to the closure ring and/or the support plate can be moved relative to the pressure cup.

The control of the closing member can be automated for example, by using a control device for moving it between an open position and a closed position in accordance with the working cycle of the apparatus.

The closing member and the compound inlet opening within the injection head can be accommodated by providing the closing member with an actuating shaft extending through a bore in the injection head. The bore can be readily widened to form an annular chamber adjacent the compound inlet opening into the injection chamber. A compound inlet line can be provided through the injection head leading into the annular chamber from which the fluidized pourable compound can flow through the compound inlet opening into the injection chamber.

In accordance with a preferred embodiment, the isostatic compression molding tool is used as a bottom force and the injection head as a top force. The compound inlet opening is arranged as close to the center of the injection chamber as is possible.

The basic concept of the invention is also applicable in so-called "hanging" molding presses in which the molding tools open and close in horizontal direction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
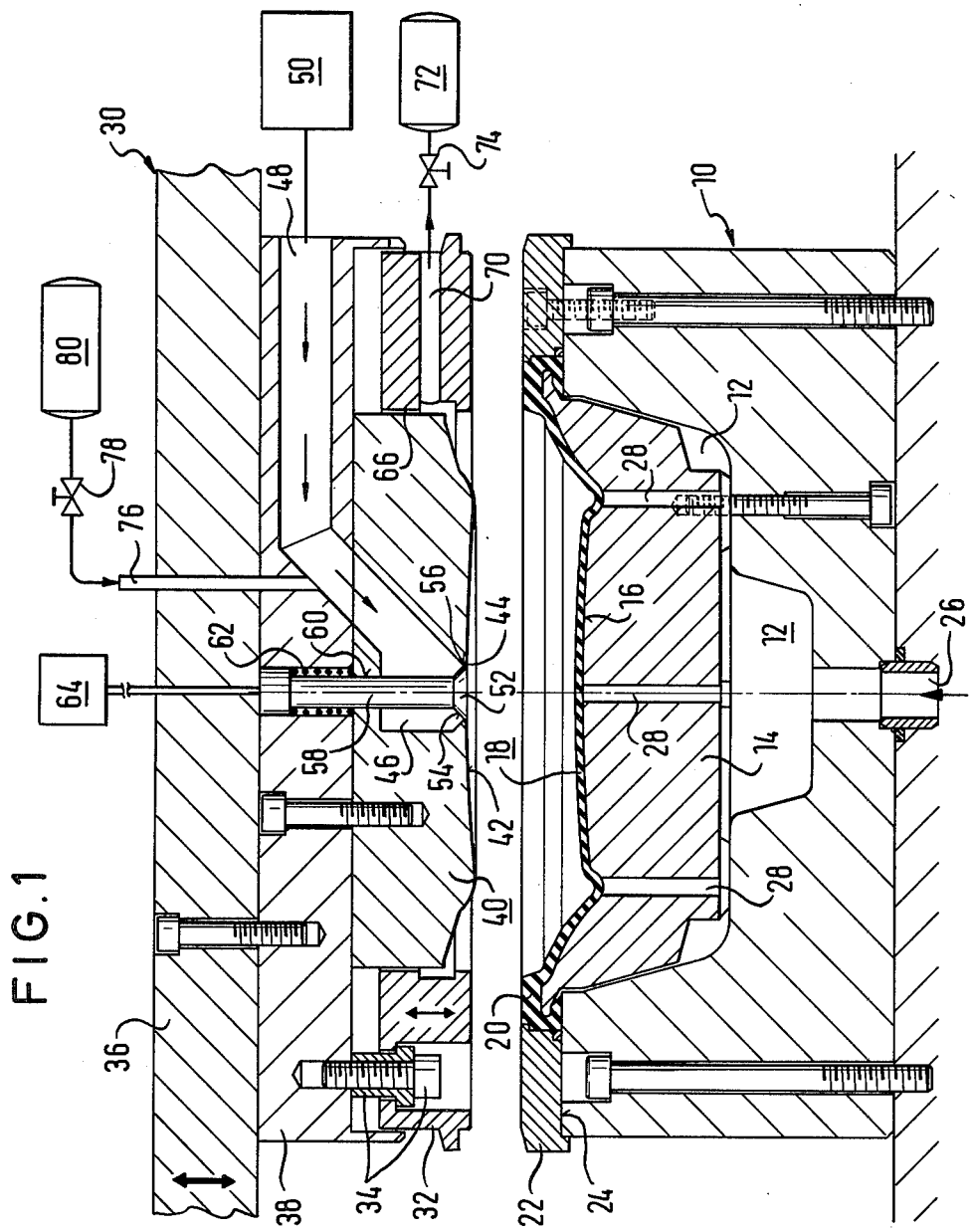
FIG. 1 is a vertical sectional view illustrating apparatus embodying the present invention with the apparatus shown in the open position.

In the drawing, the apparatus embodying the present invention includes an isostatic pressure cup 10. A pressure chamber 12 is formed in the isostatic pressure cup 10. A stationary support plate 14 is positioned in the pressure chamber 12. Support plate 14 has a molding surface 16 on its upwardly facing side. A compression membrane 18 formed of an elastically deformable material is placed over molding surface 16 so that it conforms to the molding surface. The circumferential edge 20 of the compression membrane 18 is profiled so that it engages over the edge of the support plate 14 and is secured to the upwardly facing edge 24 of the pressue cup 10 by a fastening ring 22. A high pressure hydraulic line 26 extends upwardly into the pressure chamber 12 so that a high pressure fluid, such as a hydraulic oil, can be admitted through the line into the pressure chamber. This high pressure fluid is distributed through bores 28 in the support plate 14 against the bottom side of the compression membrane 18 for pressing the membrane upwardly during isostatic compression.

The isostatic compression molding tool 10 cooperates with an injection head 30 positioned above the molding tool. Injection head 30 includes an upper pressure plate 36 with an intermediate plate 38 fixed to the lower side of the pressure plate. A closure ring 32 is axially movably supported from the intermediate plate. The maximum distance between the closure ring 32 and the intermediate plate 38 is established by a bolt-sleeve combination 34. A molding die 40 having a molding surface 42 on its downwardly facing side, is positioned within the closure ring and is supported on the intermediate plate. A compound inlet opening 44 is formed in the molding surface 42. The compound inlet opening 44 forms an outlet from an annular chamber 46 located within the molding die 40. Annular chamber 46 is connected to a compound supply line 48 extending inwardly through the intermediate plate 38 and the molding die 40 to the annular chamber. Compound supply line 48 connects the annular chamber 46 with a compound supply vessel 50. A frusto-conically shaped closing member 52 is located in the compound inlet opening 44 with the surfaces of the closing member diverging in the downward direction. The support surface 54 formed by the frusto-conical surface of the closing member 52 bears against a similarly shaped support surface 56 in the molding die 40 encircling the compound inlet opening 44. As shown in FIG. 1, in the closed position, the surface of the closing member 52 facing into the injection chamber 68 is flush or forms a continuation of the molding surface 42 formed by the molding die 40.

A shaft 58 extends upwardly from the closing member 52 and is guided within a bore 60 through the molding die and the intermediate plate. In the closed position, the closing member is biased upwardly by a helical compression spring 62 located within the bore 60 in the region of the intermediate plate 38. A control device 64 moves the closure member 52 between the closed position shown in FIG. 1 and the open position shown in FIG. 2. The control device 64 operates in accordance with the working cycle of the apparatus.

An annular gap 66 is formed between the inner surface of the closure ring 32 and the outer surface of the molding die 40. Annular gap 66 opens into the injection chamber 68 formed between the molding surface 42 and the compression membrane 18. A negative pressure line 70 extends through the closure ring 32 between the annular gap 66 and a negative pressure generator 72 positioned outwardly from the closure ring. A valve 74, controlled by the working cycle of the apparatus, is positioned in the line 70.

Figure 2:
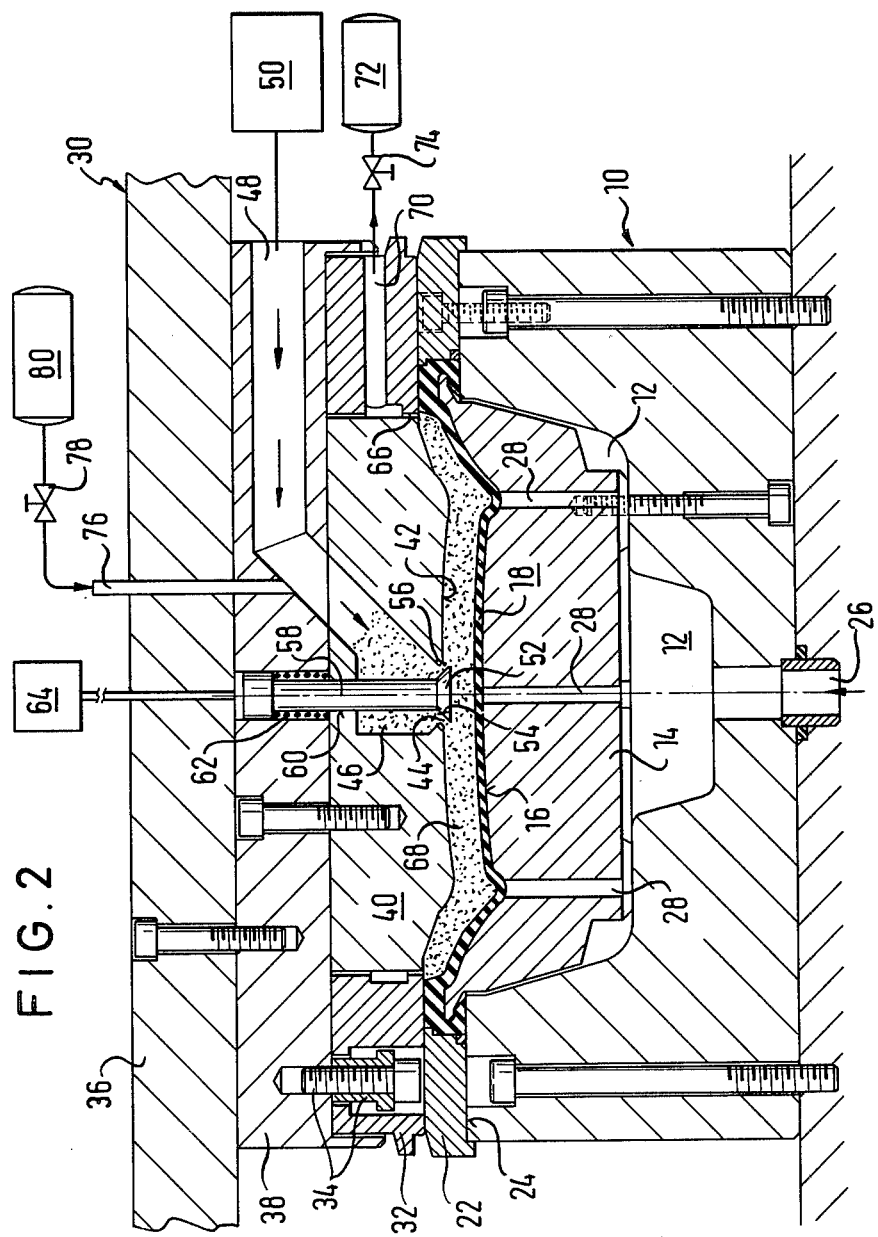
FIG. 2 is a sectional view similar to that shown in FIG. 1 however, showing the apparatus in the closed position with the injection head lowered onto the isostatic compression molding tool.

A fluidizing air line 76 extends downwardly through the injection head 30 into the compound supply line 48. A valve 78, controlled in accordance with the working cycle of the apparatus, is located in the line 76 so that the line can be connected to the atmosphere or to a pressure supply 80. Based on the apparatus described thus far, the method of producing a molded article is carried out as follows:

Initially, the injection head 30 relative to the molding tool 10, is in the raised position illustrated in FIG. 1. In accordance with the working cycle of the apparatus, the injection head 30 is lowered onto the isostatic compression tool 10 into the position shown in FIG. 2. As the injection head 30 is lowered first the closure ring 32 contacts the profiled edge 20 of the compression membrane 18 and the fastening ring. As the injection head is lowered further, closure ring 32 contacts the intermediate plate 38 and, finally, the molding surface 42 reaches its lower end position, as illustrated in FIG. 2. Initially, the pressure acting on the pressure plate 30 is solely transmitted to the support ring 22 through the closure ring 32. At this point, the injection chamber 68 is closed. By opening valve 74, a negative pressure is applied to the injection chamber 68. It is possible to apply the negative pressure while the injection head is being lowered toward the molding tool 10. After the negative pressure has been established in the injection chamber 68, or during the build-up of the negative pressure, the closing member 52 is displaced downwardly by the control device 64 into its open position as shown in FIG. 2. With the closing member 52 in the open position, molding compound can be drawn from the molding compound vessel 50 via the line 48 into the annular chamber 46 around the shaft 58 and then through the compound inlet opening into the injection chamber 58 due to the negative pressure acting within the chamber. For details of the feeding of the molding compound, attention is directed to the above-mentioned patent application. Spray-dried porcelain compounds in the form of granulates are particularly suitable as molding compounds. Suction within the injection chamber 68 takes place at the commencement of the filling operation so that no compacted accumulations of the molding compound develop at the annular gap 66 into the injection chamber 68. Compacted accumulations could prevent the suction action from being effective in the injection chamber. By means of the fluidizing air supplied through the line 76, fluidized molding compound flows into the injection chamber so that a uniform distribution results throughout the injection chamber. As a result, the distribution of the grain sizes of the granulate is approximately the same throughout the injection chamber.

After the injection chamber is filled, the closing member is lifted into the closed position and its frusto-conical surface 54 bears against the juxtaposed frusto-conical surface 56 on the molding die 40. The surface of the closing member 52 facing into the injection chamber 68 forms a continuation of the molding surface 42 adjacent the compound inlet opening 44 and though the compound inlet opening 44 is closed, the vacuum or negative pressure conditions within the injection chamber 68 are maintained. Subsequently, high pressure fluid is supplied through line 26 between the compression membrane 18 and the molding surface 16 causing the compression membrane 18 to move upwardly and compress the molding compound under a pressure of about 300 bar. Since negative pressure conditions prevail in the injection chamber 68 from the outset of the flow of the molding compound of the chamber, there is no danger that air is entrapped as the molded article is formed.

After the isostatic compression has been completed, the communication between the injection chamber 68 and the negative pressure chamber generator 72 is cut off. The injection head can be lifted and possibly swung to the side and the finally compressed molded article can be removed from the isostatic compression molding tool so that further processing can be effected. At the location of the compound inlet opening 44 it is possible that a small mark may be visible, however, such a mark can be easily deflashed. At any rate, additional compression is not required.

It is also possible to perform mechanical precompression prior to the isostatic compression. As an example, such precompression can be performed, during the filling procedure, whereby the closure ring 32 is completely lowered and placed in sealing engagement on the profiled edge 20 of the compression membrane 18, however, the molding die 40 is not completely lowered, so that the injection chamber 68 is initially larger during filling than when the molding die is completely lowered. The subsequent lowering of the molding die causes a precompression. The operational sequence can be controlled, for example, with a spring provided between the closure ring 32 and the intermediate plate 38 and the pressure acting on the pressure plate 38 is adjusted for the filling procedure so that the spring is not completely compressed, but is compressed only when the molding die is to be completely lowered for the purpose of compression.

On the other hand, it would be conceivable to position a power device between the pressure cup 10 and the support plate 14, so that the support plate 14 with the membrane 18 can be pressed upwardly for the purpose of precompression.

While specific embodiments of the invention have been shown and described in detail to illustrate the application of the inventive principles, it will be understood that the invention may be embodied otherwise without departing from such principles.

We claim:

1. In a method of producing molded articles form a pourable ceramic forming compound wherein an injection chamber with an outer cirucmferential periphery is formed between an injection head and an isostatic compression molding tool, comprising the steps of supplying the pourable compound from a source to the injection chamber, fluidizing the pourable compound, establishing a negative pressure within the injection chamber and, by using the negative pressure, drawing the compound into and filling the injection chamber, and subsequently isostatically compressing the compound filled into the injection chamber and continuing to evacuate gases from the injection chamber during at least the initial phase of the compressing step, the improvement comprising providing a closable opening extending centrally into the injection chamber, and through which the pourable compound is filled into the injection chamber centrally of the outer circumferential periphery, flowing the pourable compound from the source through the injection head to the closable opening and fluidizing the pourable compound by injecting air within the injection head adjacent to the closable opening and before introducing the pourable compound into the injection chamber applying the negative pressure around the outer circumferential periphery of the injection chamber most remote from central closable opening, closing the opening into the injection chamber when the pourable compound has been filled into the injection chamber so that in the closed position the surface through which the opening extends forms a continuation of the surface of the injection chamber conforming to the shape of the molded article being formed, and applying the final compression to the molded article within the injection chamber while continuing to evacuate gases from the injection chamber.

2. Method, as set forth in claim 1, including the step to, prior to the isostatic compression, mechanically precompressing the molded article by moving at least one of the molding surfaces of the injection head and isostatic compression molding tool toward the other at least one time.

3. Apparatus for producing molded articles for a pourable ceramic forming compound comprising an isostatic compression molding tool and an oppositely disposed injection head, said injection head is movable from a first position toward said molding too into a second position and in this second position said injection head and molding tool form therebetween an injection chamber, a compound supply line opening into said injection chamber, said injecting head having at least one suction opening communicating with said injection chamber and at least one compound supply line opening into said injection chamber, wherein the improvement comprises that said injection head is capable in combination with said molding tool of effecting the final compression of the molded article at a pressure in the range of 300 bars, said compound supply line extends through said injection head and opens centrally into said injection chamber, said injection head defining a gap extending around the radially outer circumferential periphery of said injection chamber and spaced radially outwardly from said compound supply line opening and forming said at least one suction opening to said injection chamber, a closing member located within the opening from said compound supply line into said injection chamber, said injection head having an annular chamber around said closing member at said compound supply line opening to said injection chamber, means for supplying fluidizing air into said compound supply line adjacent to said annular chamber and said closing member is displaceable between an open position for admitting pourable compound into said injection chamber and a closed position blocking flow of the pourable compound into said injection chamber, and in the closed position the surface of said closing member facing into said injection chamber is flush with the adjacent wall surface of said injection head defining the surface of said injection chamber.

4. Apparatus, as set forth in claim 3, wherein said closing member has a support surface thereon facing outwardly from said injection chamber, said injection head has a support surface thereon complementary to said support surface on said closing member and disposed in supporting contact with said support surface on said closing member when said closing member is in the closed position.

5. Apparatus, as set forth in claim 3 or 4, wherein a control device moves said closing member between the opened and closed positions in accordance with the working cycle of the apparatus.

6. Apparatus, as set forth in claim 5 wherein an actuating shaft is secured to said closing member on the side thereof facing outwardly from said injection chamber, said injection head has a bore therein with said actuating shaft extending axially through said bore, said bore is radially widened adjacent said closing member forming said annular chamber around said closing member and said actuating shaft for receiving the pourable compound before it passes into said injection chamber, and a compound supply line extending through said injection head into said annular chamber for supplying the pourable compound to said annular chamber from a source.

7. Apparatus, as set forth in claim 3 or 4, wherein said isostatic compression molding tool comprises a pressure cup with the opening in said cup facing toward said injection head, a support plate positioned within the opening in said cup, said support plate having a molding surface directed into said injection chamber, a compression membrane extending over said molding surface, said compression membrane having a circumferential membrane edge encircling said injection chamber, an edge member formed on the end of said pressure cup facing toward said injection head, said membrane edge is tightly connected to said edge member, means for supplying a pressurized medium through said pressure cup into the space between said compression membrane and said molding surface on said support plate, said injection head includes a closure ring positioned in spaced relation to said membrane edge in the first position of said injection head and in contact with said membrane edge in the second position of said injection head, and a molding die located within said closure ring and said closing member positioned in said molding die.

8. Apparatus, as set forth in claim 7, wherein for effecting mechanical precompression, at least one of said molding die is adjustable relative to said closure ring and said support plate is adjustable relative to said pressure cup.

9. Apparatus, as set forth in claim 7, wherein said peripheral gap forming said suction opening comprises an annular gap formed between juxtaposed surfaces on said closure ring and said molding die, a suction system, a suction line extending between said suction system and said annular gap with said suction line extending through said closure ring.

10. Apparatus, as set forth in claim 9, wherein for effecting mechanical precompression, at least one of said molding die is adjustable relative to said closure ring and said support plate is adjustable relative to said pressure cup.

* * * * *